US006595671B2

(12) United States Patent
Lefebvre et al.

(10) Patent No.: US 6,595,671 B2
(45) Date of Patent: Jul. 22, 2003

(54) RUGGED, WATERPROOF LED ARRAY LIGHTING SYSTEM

(76) Inventors: Maxime Lefebvre, 24 Lorong Sarhad, Singapore (SG); Kenneth Moreau, 135 Sixth St., Bridge City, LA (US) 70094

(*) Notice: Subject to any disclaimer, the term of this patent is extended or adjusted under 35 U.S.C. 154(b) by 0 days.

(21) Appl. No.: 09/852,130

(22) Filed: May 9, 2001

(65) Prior Publication Data

US 2002/0030992 A1 Mar. 14, 2002

Related U.S. Application Data

(60) Provisional application No. 60/203,009, filed on May 10, 2000.

(51) Int. Cl.$^{7}$ .............................. F21S 8/10; F21V 7/04; G02B 5/32

(52) U.S. Cl. ....................... 362/545; 362/240; 362/241; 362/247; 362/307; 362/310; 359/15

(58) Field of Search ................................ 362/240–247, 362/310, 311, 327–329, 543–545, 307; 313/500, 512; 359/15; 40/542, 544, 582

(56) References Cited

U.S. PATENT DOCUMENTS

| | | | | |
|---|---|---|---|---|
| 4,632,798 A | | 12/1986 | Eickmann et al. | 264/272.17 |
| 4,774,434 A | | 9/1988 | Bennion | 313/500 |
| 4,826,896 A | | 5/1989 | Procter | 523/443 |
| 5,093,768 A | | 3/1992 | Ohe | 362/241 |
| 5,162,696 A | | 11/1992 | Goodrich | 313/511 |
| 5,241,457 A | | 8/1993 | Sasajima et al. | 362/503 |
| 5,313,729 A | | 5/1994 | Sakai et al. | 40/452 |
| 5,455,747 A | * | 10/1995 | Aoyama | 362/545 |
| 5,467,544 A | * | 11/1995 | Treuberg | 40/582 |
| 5,528,474 A | | 6/1996 | Roney et al. | 362/249 |
| 5,582,474 A | * | 12/1996 | Van Order et al. | 362/245 |
| 5,632,551 A | | 5/1997 | Roney et al. | 362/249 |
| 5,711,592 A | * | 1/1998 | Hotta | 359/15 |
| 5,946,837 A | | 9/1999 | Ackers | 40/558 |
| 6,177,761 B1 | * | 1/2001 | Pelka et al. | 313/512 |

OTHER PUBLICATIONS

Coburn Corporation Internet Home Page "Whats New" section entitled "Fascinating Visual Effects with Coburn's Multi–Lens and Diffractolite Films(1)" at http://222.coburn.com/whatsnew/nw_dazzle1.htm dated May 8, 2001.

Coburn Corporation Internet Home Page "Whats New" section entitled "Fascinating Visual Effects with Coburn's Multi–Lens and Diffractolite Films(2)" at http://222.coburn.com/whatsnew/nw_dazzle1.htm dated May 8, 2001.

Coburn Corporation Internet Home Page "Whats New" section entitled "Fascinating Visual Effects with Coburn's Multi–Lens and Diffractolite Films(3)" at http://222.coburn.com/whatsnew/nw_dazzle1.htm dated May 8, 2001.

* cited by examiner

*Primary Examiner*—Alan Cariaso
(74) *Attorney, Agent, or Firm*—Joseph T Regard Ltd

(57) ABSTRACT

A taillight (stop and signal) for marine and utility trailers, as well as general use. The assembly consists of a light emitting diode (LED) array, circuitry and reflecting/diffracting surface which may have holographic characteristics all encapsulated in a clear resin. The reflecting/diffracting surface is positioned in the back of the assembly; its shape consists of a multitude of sharp edges or corrugations, forming a reflecting body. The LEDs within the array are directing their light beams on the knuckle edges of the reflecting body. Each light beam shows reflection on more than one surface. The reflected light beams generated induce a glow to the encapsulating medium. The duplication of the light beam results in an intensified array displaying a uniform light generation.

13 Claims, 6 Drawing Sheets

FIG. 11D
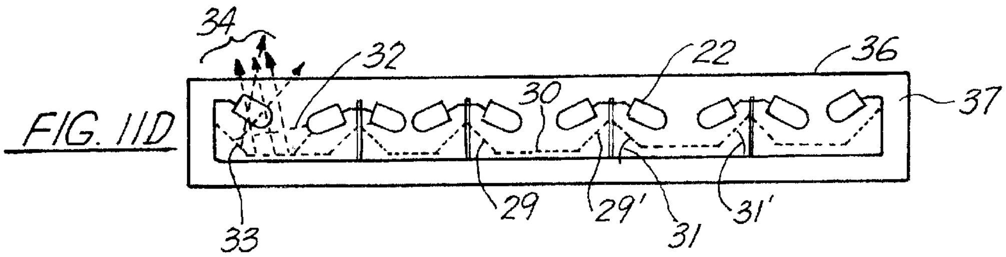
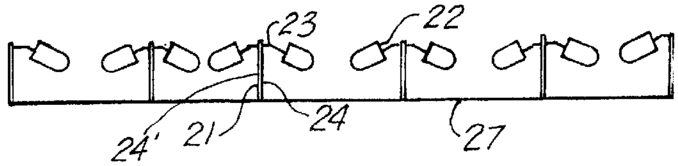
FIG. 11B
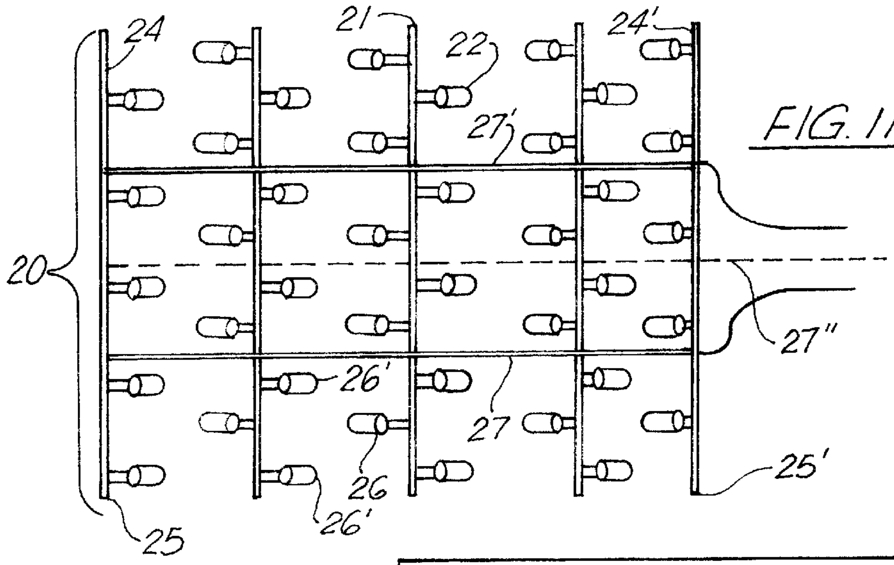
FIG. 11A
FIG. 11C
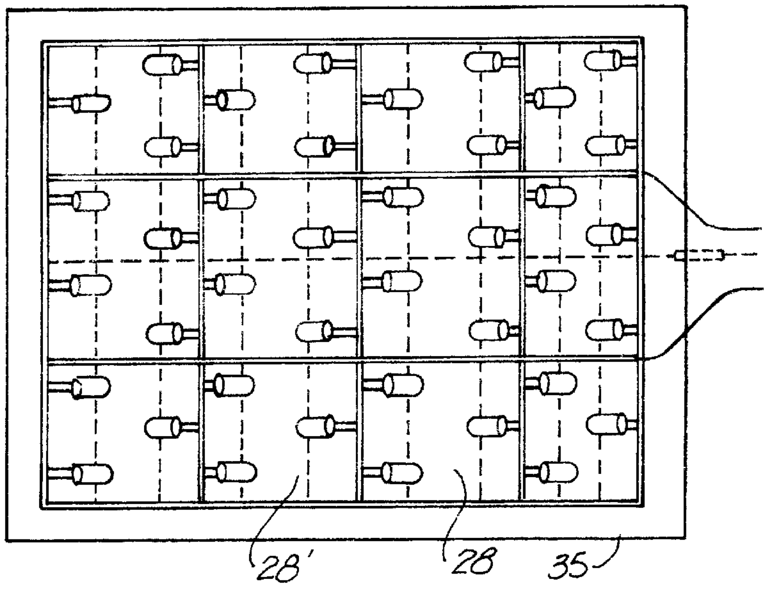

RUGGED, WATERPROOF LED ARRAY LIGHTING SYSTEM

STATEMENT OF CONTINUING APPLICATIONS

The present application is a Continuation-In-Part of U.S. Provisional Application Ser. No. 60/203,009 filed May 10, 2000 entitled "Rugged, Waterproof LED Lighting System", listing as inventors Maxime Lefebvre and Kenneth Moreau.

FIELD OF THE INVENTION

The present invention relates to the lighting, and in particular to a lighting system suitable for utilization with vehicles, including particularly a marine/utility trailer, as well as any environmental use entailing harsh environment exposure, water immersion and occasional impact, such as lighting in hot tubs, whirlpools, Jacuzzis, and swimming pools. Alternatively, the lighting system of the present invention is suitable for use as a light source in various diverse applications including interior/exterior lighting, and may be formed as a component of a structure wall or building block. Lastly, the present invention is suitable for use in potentially explosive atmospheres, such as grain silos, mines, chemical plants, and the like.

The preferred embodiment of the present invention contemplates an array of LED's directed towards a reflective surface having diffractive or holographic properties, the system encased in a block of light transmissive resin. The light reflective surface, in conjunction with the light transmissive resin, is configured to diffuse and disperse the reflective light to provide a "light pipe" effect wherein the entire block glows to provide a relatively bright, uniform light which is an efficient, waterproof, rugged, and reliable unit, which requires little operational maintenance.

DESCRIPTION OF THE RELEVANT ART

While the prior art contemplates extensive variations of vehicle lighting, most utilize traditional incandescent bulbs, and certain applications, including conventional marine trailer lighting systems, continue to require extensive maintenance to insure continued operations. The exposure to saline inherent in marine applications deteriorates the mounting of conventional automotive light bulbs, frames, and connectors. With time, corrosion shows on the lead/socket/light bulb assembly and stop electrical conductivity, thereby disabling the light.

Further, corrosion is often so extensive that it seizes the bulb to the socket assembly, making the replacement of the bulb difficult and often resulting in physical damage to the socket. It is for this reason that marine trailer light systems may have to be replaced on several occasions over the life of the trailer.

The typical marine taillight protects its electrical components with the creation of a sealed air pocket that restricts the ingress of water in its housing to a certain level. This air pocket is achieved by making the housing of the assembly air tight with an open base. However, if the seals from the lenses are leaking, or the housing is cracked, nothing keeps the water from getting in contact with the bulb/socket assembly. Similar constructions are found with lights utilized in potentially explosive atmospheres; however, if the seals encapsulating the light bulb fail, and the atmosphere is allowed to leak into the enclosure, potentially catastrophic consequences can result.

Lighting systems found in whirlpools, Jacuzzis, hot tubs, and swimming pools, which also form a wet, inhospitable environment for electrical equipment, suffer similar problems.

Most lighting assemblies are fabricated from polyethylene or the like, and eventually develop cracks due to excessive UV exposure, corrosion of the screw holding it together, and excessive vibration and breakage from travel and positioning when used in vehicles or trailers. Marine trailers are often subjected to impacts from many different sources; tie down gear, boat launch apparatus and unintentional collisions with foreign objects while backing up for launch.

When water permeates the housing, in most cases the bulb is destroyed on contact, due to the thermal stresses. The hot glass of the bulb shatters in contact with the cool water, rendering the light inoperative and useless.

U.S. Pat. No. 5,241,457 teaches a "Rear Window Stop Lamp for Motor Vehicles" wherein an LED chip is disposed in a resin molded body substantially at a focal point of a curved reflective surface, with the light passing through a light distributing fresnel lens to form a "rear window stop lamp for motor vehicles".

U.S. Pat. No. 5,528,474 teaches an "LED Array Vehicle Lamp" illustrating an array of LED's mounted to a circuit board which is fully embedded in resin material. In manufacture, resin is poured in a mold to encase the LED array and circuit board, the resin then being allowed to cure to form a solid, monolithic structure.

U.S. Pat. No. 4,775,434 teaches an LED and circuit encased in an "encapsulating material" to form a lens while protecting the circuit in use.

U.S. Pat. No. 5,162,696 teaches a flat LED array encased in light transmissive PVC.

U.S. Pat. No. 5,696,837 teaches a sign comprising a light source which is encapsulated in a housing.

U.S. Pat. Nos. 4,632,798 and 4,826,896 are examples on patents involving encapsulation of electronic components.

In summary, the improvement of LED technology in terms of photometric performances in the recent years has given this technology practical uses in the automotive and other fields, wherein there has been taught in the prior art various configurations wherein LEDs are arrayed to emit light through a clear or diffused lens.

In other cases LED light beams are isolated and oriented on a reflective surface to enlarge the effective lighted area produced by each entity. Like other electronic components, encapsulation by resin has been shown in the prior art, albeit not in the manner contemplated in the present invention. Further, none of the prior art systems are believed to have taught or contemplated the present invention.

GENERAL, SUMMARY DISCUSSION OF THE INVENTION

The present invention relates to the use of light emitting diodes (LED) technology to facilitate a fluid impermeable, solid-state, multi-purpose lighting system.

The present invention has been made in effort to solve the above problems of conventional marine trailer stop and signal light assembly using LED technology with an innovative approach heretofore not contemplated by the prior art.

The present invention is much more than simply an array of LEDs encapsulated in resin. Each LED forming the array is positioned within a specified parameter so as to deflect its full light output upon a specially configured and surfaced light diffusion reflector, this combination encased in a solid light transmissive medium so as to achieve a particular illumination effect.

The type, color, and color concentration of the resin or other material forming the block, in combination with the positioning of the LEDs and diffusive rear reflector surface causes the entire light transmissive block of resin to glow in a light pipe effect which provides an efficient, bright, and environmentally pleasing lighting effect, not only for utilitarian applications (such as employed in vehicles), but also provides a suitable construction for use in diverse outdoor/indoor lighting projects.

The "light pipe" effect is such that a viewer does not particularly distinguish the LED sources, as there is a decreased perception of any LED, instead a general, bright glowing effect of the monolithic block, almost providing a glow similar to that of a neon light, in the desired shape of a block, or other monolithic shape of the unit.

This is in comparison to the prior art, wherein the light source on the LEDs were either aimed directly through the lens at the observer, or oriented at a conventional reflector, both arrangements providing the observer with readily discernable, pinpoint light sources comprising the vast percentage of the illumination from the units. The result is a somewhat harsh lighting effect, when compared to the present invention.

Not only is the monolithic block construction of the present invention rugged and waterproof, the diffusing reflective surface and "glow pipe" effect of the system provide an excellent "mood" lighting for decorative purposes, while the monolithic block construction and long life LED source provide can be incorporated into a building or other structure, including walls, ceilings, floors, as well as outdoor use (including aisles, sidewalks, roads or runways) to provide ambient lights, traffic lights, signaling lights, or other diverse applications which require reliable, safe, low maintenance operations in harsh conditions.

It is iterated that, while a block is shown as the exemplary configuration, the technologies embodied in the present invention may be utilized similarly in other configurations, including circular, as well as linear or strip configurations.

It is therefore object of the present invention to provide a taillight (stop and turn signal) for the marine and utility trailer, which is impervious to water, and saline environments.

It is another object of the present invention is to provide a taillight with a good impact resistance.

It is another object of the present invention to provide a multi-purpose light source with a high reliability and long life duration which may be embedded in walls and sidewalks, roads, runways, floors, aisles, ceilings, and other diverse applications.

To achieve the above-mention objects, there is provided a light source comprising an array of light emitting diodes (LEDs), further including electronic power via a power supply and associated electrical connections, a rear reflecting/diffraction surface which may have holographic properties, and an encapsulating medium. The preferred embodiment of the reflective surface incorporates a holographic diffusion pattern configured to break/disperse the light beam, which may further act as a reflector when the light assembly is not energized, a feature which is useful in vehicle applications.

Unlike the prior art, the encapsulating medium itself is used in conjunction with the reflecting body as a diffusing device, the combination in lieu of a conventional light source-lens combination. The monolithic, single-body construction may be mounted in a polymer housing used as a mounting interface which may also function as a shock/vibration damper to complete the unit, or the construction may incorporate the mounting hardware in the monolithic block itself, providing a truly one-piece lighting system.

The light assembly is achieved in two (2) steps. Step one (1): the LED array is erected between at least two (2), generally parallel vertical circuit boards in this invention. Each LED forming the array is positioned so that the light source shines at an angle relative to a corrugated reflective surface vertically mounted between the circuit boards. Within the array, the LEDs are oriented at an angle aimed at the knuckle edges of a corrugated, diffusive, reflective surfaces for the light dispersion effect and to increase the angle of refraction. Step two (2): The sub-assembly of step one (1) is encapsulated in a light transmissive resin which has color pigmentation to minimize the sun light penetration and to further diffuse the LEDs light beams.

The encapsulating medium by itself provides an envelope protecting the vital components from the surrounding environment and impacts.

An opaque coating may further be added on the assembly to designate the viewing angles of the single body taillight construction.

The above and further objects, details and advantages of the present invention will become apparent from the following description of preferred embodiments thereof, when read in conjunction with the accompanying drawings.

It is therefore an object of the present invention to provide a light source comprising an array of LEDs embedded in a monolithic block of light transmissive material, said LED's light emitters oriented toward a rear light diffusing, corrugated reflective surface, so as to provide a "glow pipe" effect.

It is another object of the present invention to provide a rugged, waterproof, highly energy efficient and long life lighting system which is diverse in its use.

It is another object of the present invention to provide a rugged, waterproof, light source which may be embedded in a building construction, swimming pool, hot tub, road, runway, traffic signal, or the like.

It is another object of the present invention to provide a system for lighting a whirlpool, tub, swimming pool, or Jacuzzi utilizing an array of LEDs embedded in a monolithic block, said monolithic block incorporating a diffusive reflecting surface so as to redirect light from said LEDs through the encapsulating medium in a "light pipe" effect.

It is another object of the present invention to provide a light source which provides a glow suitable for decorative or informative purposes, such as boundary indications, mood lighting, or the like.

It is still another object of the present invention to provide a method of making a light source utilizing an array of LEDs and a corrugated reflector entombed in a monolithic block of light transmissive polymer, Lastly, it is an object of the present invention to provide a light source comprising an array of LED's having their light sources directed toward a diffusive, reflective surface situated behind said LED's within a monolithic block of light permeable material, said light source configured to diffuse said LED's within said array in a glowing "light pipe" effect.

BRIEF DESCRIPTION OF THE DRAWINGS

FIG. 11A is a top view of an alternative embodiment of the present invention for general lighting use, illustrating the vertical layout of the circuit boards, arrangement of the LEDs situated thereupon, and first and second serial bus wires, so as to form an LED array.

FIG. 11B is a side view of the invention of FIG. 11A.

FIG. 11C is a top view of the invention of FIG. 11A, illustrating the LED array placed in a mold tray, and four reflector strips placed between each vertically aligned circuit board, each of the reflector strips being folded to provide a reflective, corrugated surface.

FIG. 11D is side view of the complete monolithic light block of FIG. 11A, after resin was poured and cured in the mold of FIG. 11C, so as to encapsulate the LED array with the reflector strips situated therein.

DETAILED DESCRIPTION OF THE PREFERRED EMBODIMENTS

A taillight according to a first embodiment of the present invention will be described below with reference to FIGS. 1 through 8.

Figure 1:
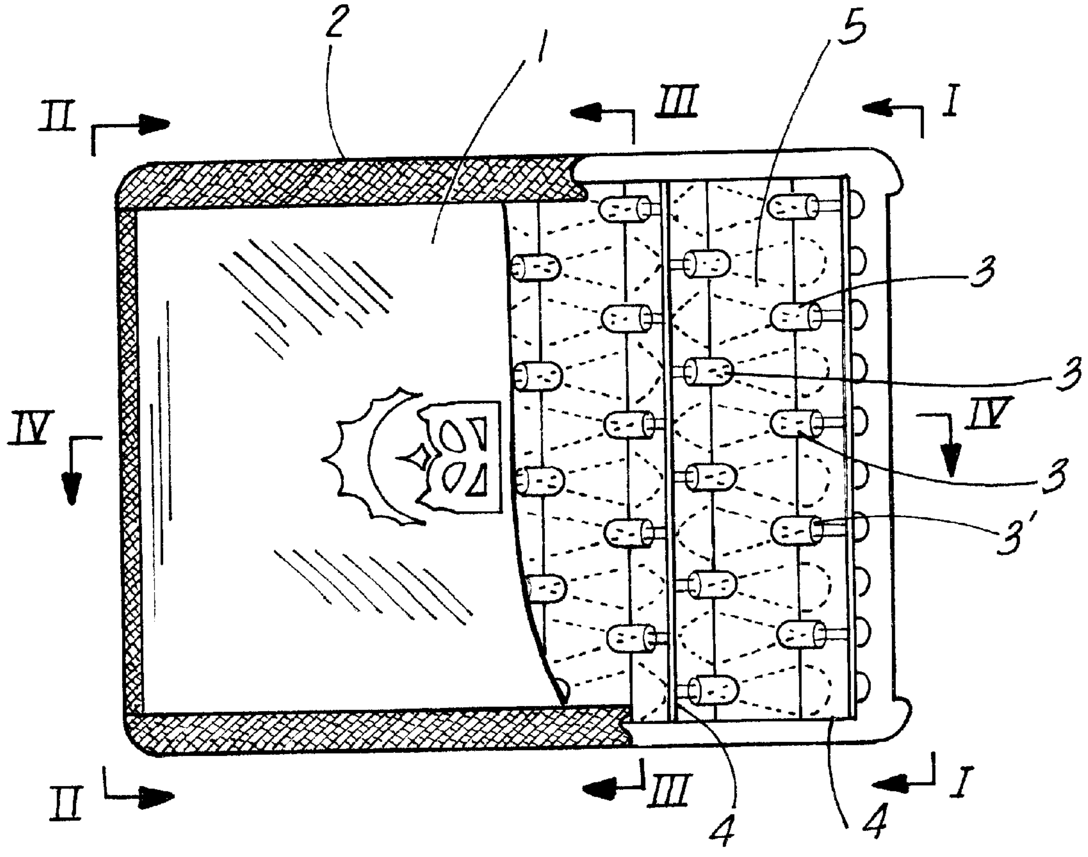
FIG. 1 is a front view of the taillight assembly, as viewed from behind the vehicle. In lieu of the present document the right hand unit is shown, the left unit is similar and opposite.

FIG. 1 shows the system of the present invention in the form of a right hand side taillight as viewed from behind the trailer. The view shows the single body light construction 1 with a solid color coating 2 applied to the unit to limit the viewing angles. The solid color coating is an option which may not or not be implemented, depending upon the use and desired light output.

A plurality of LED's 3' are provided to form an LED array 3, the LED's arranged in a generally parallel configuration via pairs of vertically arranged circuit boards 4, which are all monolithically encased in a single body light construction 1 made of clear encapsulating resin.

The body may be formed of a single monolithic block of polymer resin such as epoxy, polyester or the like, which resin may include UV inhibitors as well as a color concentrate (for example, about 1% depending upon the concentration) to color the block, in this case, red.

The corrugated reflective/refractive surface 5 in the preferred embodiment of the present invention comprises a strip of holographic pattern or metallized prism plastic film as provided by Coburn Graphic Films, Inc. of Lakewood N.J., marketed under the trademark DIFFRACTO-LITE brand vacuum metalized prism plastic films; an exemplary pattern which may be used could be the square pattern, but various patterns are anticipated to work equally well. It is believed that the diffraction characteristics effectively diffuses the light from each LED, which diffused light is received and transmitted therethrough by the encased polymer body in a glowing, "light pipe" effect.

Note that the encapsulating resin is shown partially for clarity of the picture. The circuit boards 4 may be interconnected with electric buss bars (not shown) which are energized by connecting wires and a power source (not shown).

Figure 2:
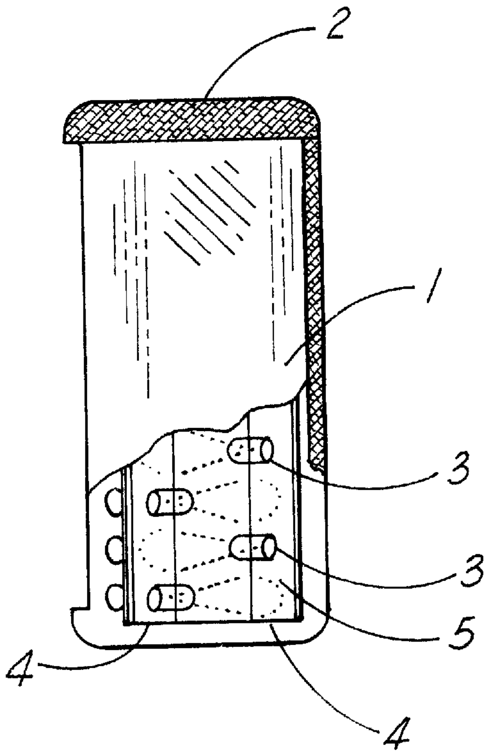
FIG. 2 is a side view from the side of the vehicle, as viewed in the direction indicated by the arrows I.

FIG. 2 shows a side elevation of the unit as seen from the side of the trailer. Just like FIG. 1, the view shows from the side the single body light construction 1 and the solid color coating 2 that affects the external appearance of the assembly. Also shown are the outline of the LED array 3, top circuit board 4, and corrugated reflective/refractive surface 5. Items listed in the previous sentence are part of the single body light construction 1 made of clear encapsulating resin. Note that the encapsulating resin is shown partially for clarity of the picture.

Figure 3:
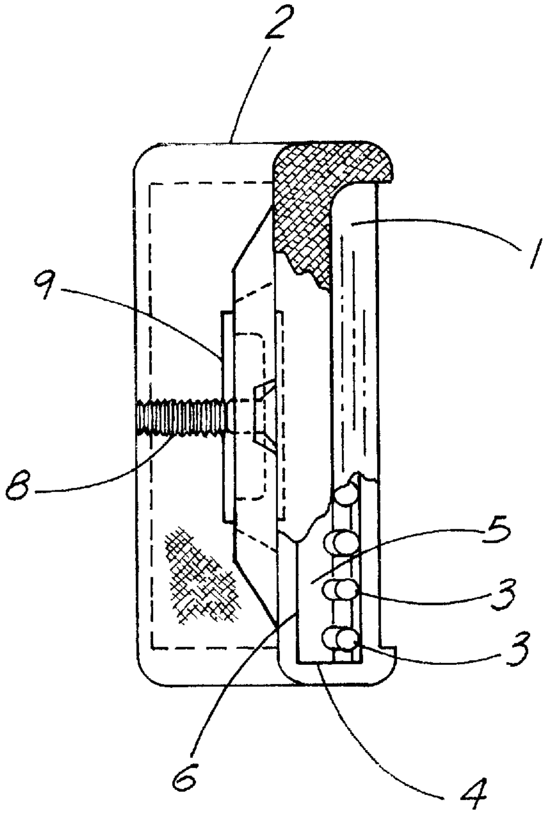
FIG. 3 is a side view from the longitudinal axis of the vehicle, as viewed in the direction of the arrows II.

FIG. 3 shows a side elevation of the unit as seen from the longitudinal axis of the trailer. Just like FIG. 1, the view shows from the side the single body light construction 1 and solid color coating 2 that constitute the external appearance of the assembly. Also shown are the outline of the LED array 3, top circuit board 4, and corrugated reflective/refractive surface 5. Items listed in the previous sentence are part of the single body light construction 1 made of clear encapsulating resin. Note that the encapsulated medium is shown partially for clarity of the picture. One of the electric buss bars 6 and the mounting hardware 8 can also be seen from this view.

Figure 4:
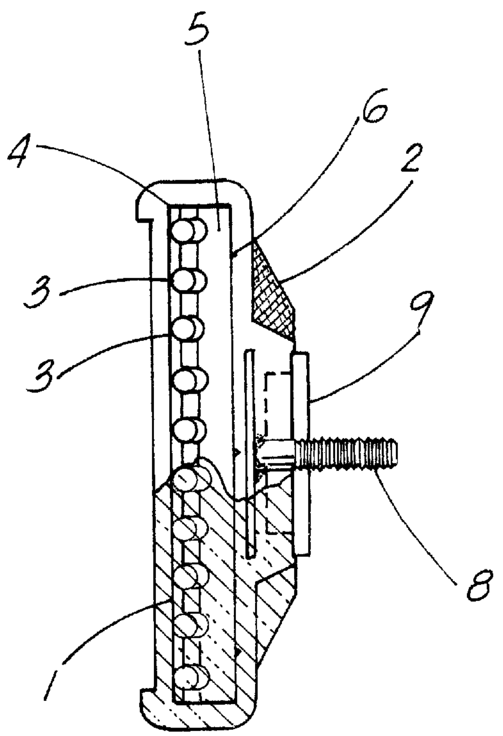
FIG. 4 is across section view of the taillight assembly, as viewed in the direction indicated by the arrows III.

FIG. 4 shows a typical section parallel to the longitudinal axis of the trailer of the single body light construction 1. Also shown are the outline of the LED array 3, vertical circuit board 4, corrugated reflective/refractive surface 5, electric buss bars, and mounting hardware 8. Items listed in the previous sentence are part of the single body light construction 1. A vibration damper pad 9, added to the assembly, is also shown.

Figure 5:
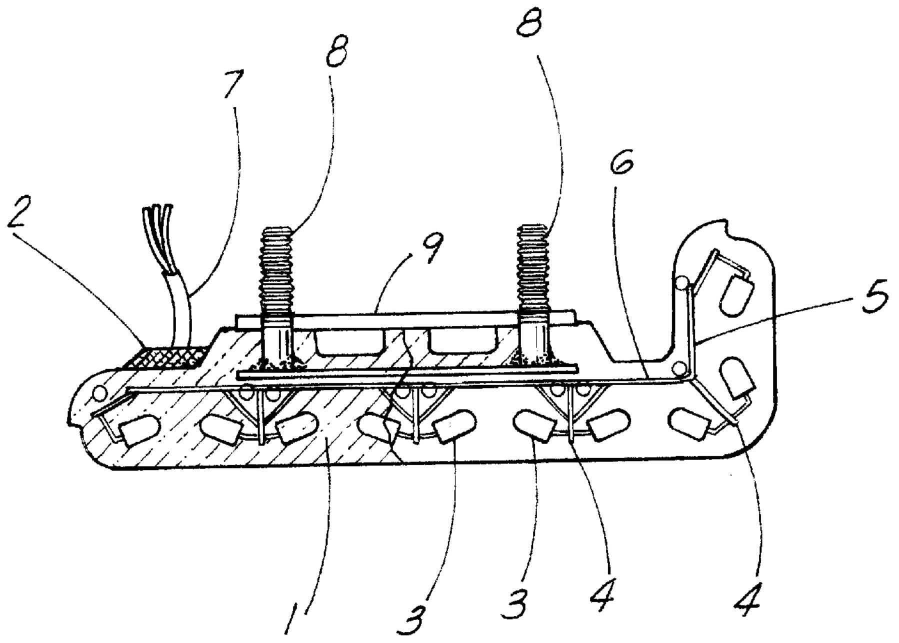
FIG. 5 is a horizontal cross-sectional view, as viewed in the direction indicated by the arrows IV.

FIG. 5 shows a horizontal cross section of the single body light construction. Also shown is the outline of the LED array 3, vertical circuit board 4, corrugated reflective/refractive surface 5, and one of the electric buss bars 6. Items listed in the previous sentence are part of the single body construction 1. The section also shows the mounting hardware 8 partially imbedded in the light construction 1. The added vibration damper pad 9 is also shown on this view, as is the power wire 7. The details of the corrugation pattern on the reflective/refractive surface 5 can clearly be seen in this section.

As shown, multiple, vertically situated, parallel circuit boards 4 are provided, some 4' having LED's emanating from one side, others 4" having LED's emanating from opposing sides of the circuit board. Each respective pair of circuit boards has a corrugated reflective/refractive surface 5 situated therebetween, with the opposing edges 10, 10' of the reflective/refractive surface folded upward in an ascending angle of about 45 degrees (plus or minus 15 degrees) with a flat reflective surface therebetween 10".

Figure 6:
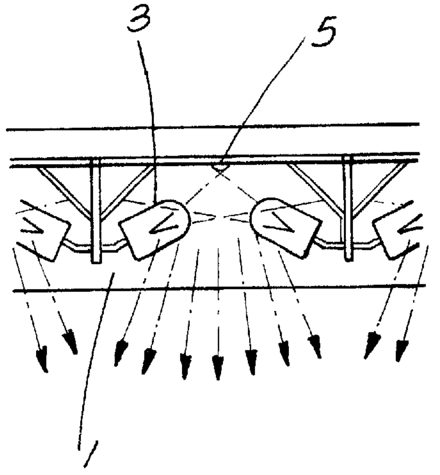
FIG. 6 is a horizontal cross-sectional view of the LED array pattern, as extracted from FIG. 5.

FIG. 6, is also a cross sectional view similar to FIG. 5, focusing on the orientation of the LED array 3 in relation to the reflective/refractive surface 5. The LED array 3 is composed of multiple LED which are staggered, the resulting light vectors are shown to demonstrate the light projection when the light construction 1 is energized. The light vectors shown are a result of the combination of the light transmission detailed in FIG. 7 and FIG. 8 described here after.

Figure 7:
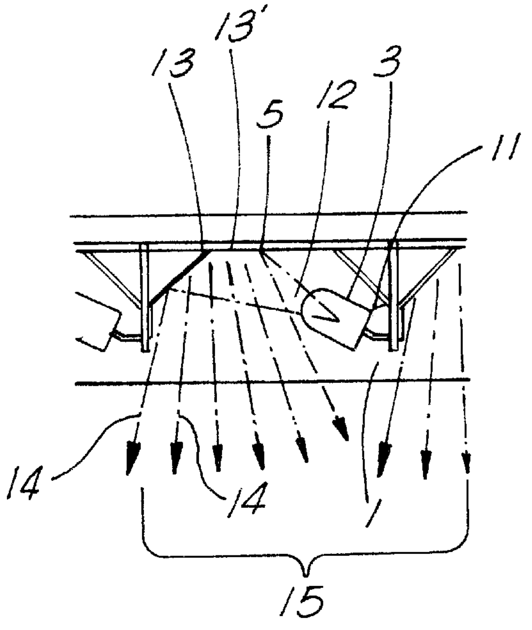
FIG. 7 is a partial view of the LED array, as indicated on FIG. 6.

FIG. 7, extracted from FIG. 6 shows the orientation of some LEDs within the LED array 3. The light vectors projected are shown to demonstrate the light transmission within the light construction 1.

Figure 8:
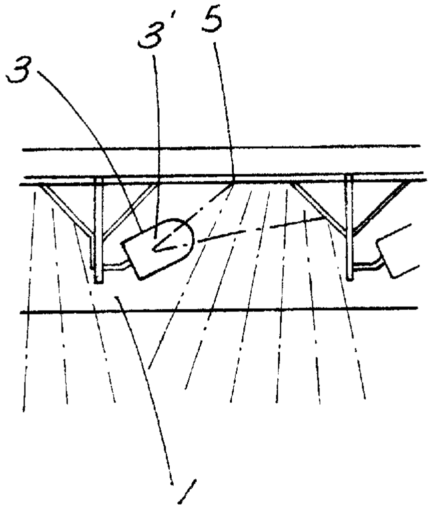
FIG. 8 is another partial view of the LED array, as indicated on FIG. 6.

FIGS. 7 and 8, extracted from FIG. 6 shows the orientation of the LEDs within the LED array 3. The light vectors projected are shown to demonstrate the light transmission within the light construction 1. As shown, the LED's 3' utilized in the present example are T 1¾ size case (5 mm diameter) having an MCB (millicandle brightness) of 2000+, having a red with clear epoxy encapsulation. In the present embodiment LED's are provided in 2.2 volt strings of 5 with a current limiting resister in series where an adjustment in brightness is desired. The LED's of the present example emit an angle of light of 22½ degrees in a cone configuration.

As shown, each LED is oriented toward the knuckle edge 13 of the opposing corrugation in the reflector situated there below, the angle of each LED about 30 degrees 11 with an operational range anticipated at about 20–40 degrees. At this angle, the LED emits a cone of light 11 at the flat middle 13' and opposing knuckle edge 13 of the corrugation of the adjacent reflective surface, which surface disperses and diffuses 14 the light through the polymer body 1, causing the sought after "light pipe" glowing effect 15. Further, the reflective surface, coupled with the knuckle edge or raised, angled fold of the reflective material re-directs light directed thereupon, further dispersing and diffusing the light from the LED array.

The LED array 3 shown in the example is made of water clear LEDs to allow the light vectors to shine through, another alternative to this construction would be to use a colored dye of the LED if available, the anvil being the light source of the LED.

In summary, the system for use of the present invention in conjunction with a vehicle signal may comprise the following steps:

a. providing a light system, comprising:
   - a plurality of light emitting diodes having first and second ends, the first ends of each of said diodes configured to provide light therefrom;
   - a corrugated reflective surface configured to disperse, diffuse, and reflect light emitting from said first ends of said light emitting diodes, said corrugated reflective surface mounted in spaced relation from said diodes, so as provide a diffused light source;
   - said a plurality of light emitting diodes and said corrugated reflective surface encased in a monolithic, light transmissive medium, said polymer body having a light emitting side and a mounting side;

B. initiating a signal light viewable from the rear of said vehicle, comprising the steps of:
   - I. mounting said mounting side of said polymer body to a vehicle;
   - II. selectively energizing said plurality of light emitting diodes, providing generated light;
   - III. reflecting said generated light from said corrugated reflective surface with holographic characteristics, so as to disperse, diffuse, and redirect said light throughout said monolithic, encapsulating medium;
   - IV. allowing said dispersed, diffused, and redirected light to emit from said light emitting side of said encapsulating medium.

FIGS. 11A–11D illustrate an alternative configuration of the present invention, configured to provide a light block in a square formation, which can be utilized in a variety of applications, as will be further discussed infra.

As shown in FIGS. 11A and 11B, an LED array 20 is provided comprising five vertically situated circuit boards 21 having LEDs 22 situated in the vicinity of their respective upper edge 23, with the circuit boards forming opposing ends 25 and 25' of the array having LEDs situated in spaced fashion emanating from the first 24 and second 24' sides of the board, respectively.

The circuit boards are situated in parallel, spaced fashion, with opposing, facing sides of adjacent boards having the LED's situated such that the LED's are staggered 26, 26' so as to more efficiently disperse the light.

First and second bus bars 27, 27' provide D.C. power (+–) to the circuit boards, while maintaining the boards in a spaced fashion. A third bus bar 27" may also be provided with a different positive voltage to provide brighter or less bright power to selective board(s) or LED(s) where different brightness is desired.

Continuing with FIGS. 11C and 11D, reflective strips 28, 28' are placed and situated between the circuit boards and under the LEDs situating therefrom, each reflective strip having first 29 and second 29' edges folded to about a 45 degree ascending angle 31, 31', respectively under the suspended LED's there above, with a flat central or medial area 30 situated therebetween.

As with the first embodiment corrugated reflective strips 28, 28' (referred to as reflective/refractive surface in the first embodiment) utilizes a strip of holographic pattern or metallized prism plastic film as provided by Coburn Graphic Films, Inc. of Lakewood N.J., marketed under the trademark DIFFRACTO-LITE brand vacuum metalized prism plastic films; an exemplary pattern which may be used could be the square pattern, but various patterns may also work equally well.

It is believed that the diffraction characteristics effectively diffuses the light from each LED, which diffused light is received and transmitted therethrough by the encased polymer body in a glowing, "light pipe" effect.

Like the first embodiment, each LED is configured to project a cone of light 32 so as to about evenly illuminate the medial 30 and raised or angled area 33 of the reflective strips; like the first embodiment, the LED's are oriented at an angle of about 30 degrees (or a range of about 20–40 degrees) to accomplish this task, so as to allow the reflective strips 28, 28' to diffuse and disperse 34 the light projected thereon. The LED ARRAY 20 with the reflective strips 28, 28' situated therein is placed in a mold 35 a polymer, such as, for example, light transmissive epoxy, polyester, or the like is poured therein to encase the LED array and to form the desired monolithic body 36, providing the finished LED array block 37.

As indicated, the polymer can be infused with a color concentrate to vary the color and depth of color, as well as a UV inhibitor, flame retardant, or other additive(s).

The system of the present invention, being monolithically encapsulated in resin, lends itself well in hazardous area use, such as an area contaminated with explosive gas, as no ignition sources are exposed to the gas in the present system, as long as the appropriate external connectors are utilized.

Figure 9:
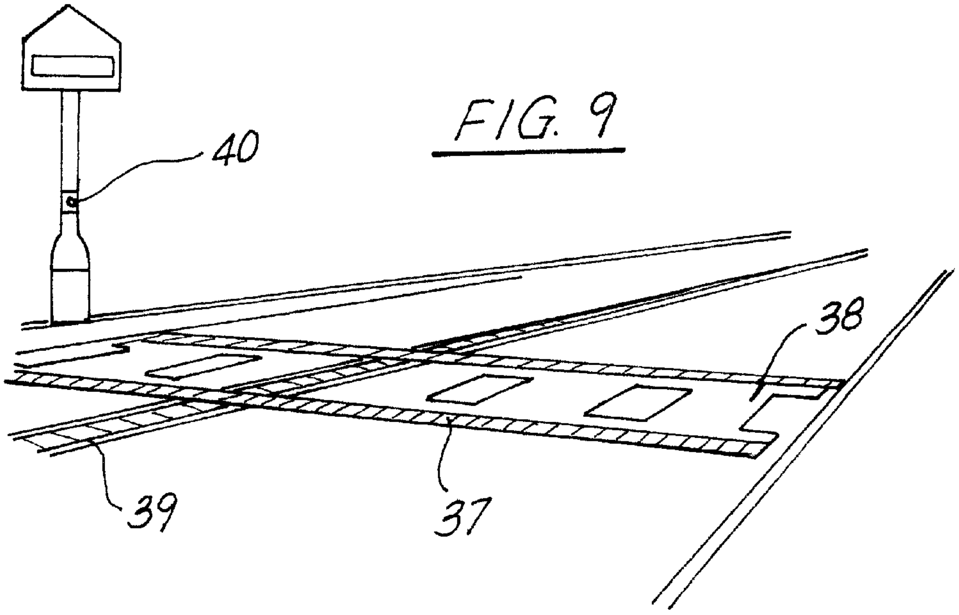
FIG. 9 is a view of an exemplary alternative application of the present invention in conjunction with street marker lights.
Figure 10:
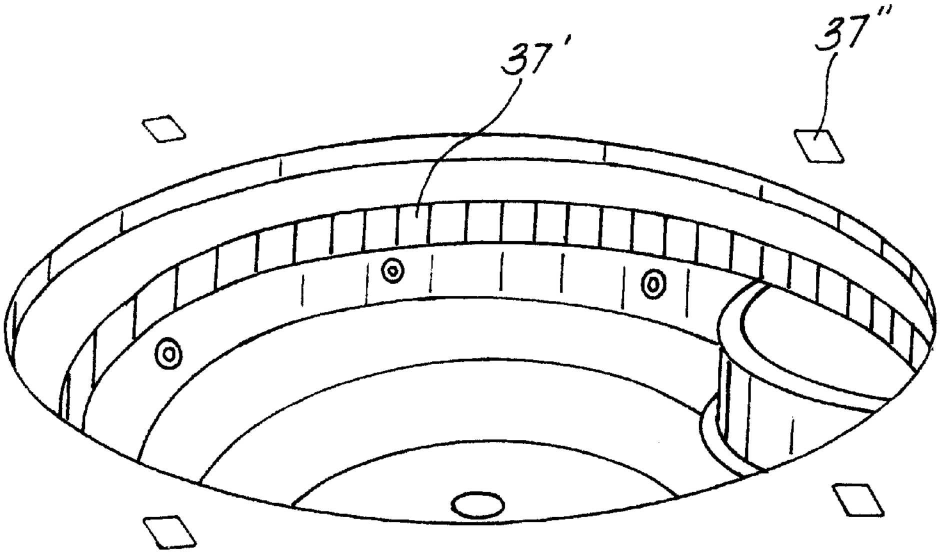
FIG. 10 is a view of a second exemplary alternative application of the present invention, in conjunction with hot tub lighting.

As shown in FIGS. 9 and 10, the LED array block 37 is rugged, utilizes nominal power, provides a unique "light pipe" glowing effect wherein the polymer body glows, and is ideal for use in delineating crosswalks, center lines or other lines or roads, airport runways, aisle boundaries, or the like. The blocks may be powered by solar power, D.C. power, or another power supply. The blocks may be in the form of strips as opposed to squares, wherein their length would be greater than their width. Such a strip could utilize, for example, only two opposing circuit boards with opposing, staggered LED's emanating therefrom, and a reflective strip situated therebetween as set forth above.

In its use as a crosswalk, an activation button 40 may be provided which the user may press to illuminate the crosswalk area, which provides the dual purpose of assisting the user in staying within the boundary, as well as alerting traffic as to its use. The LED array block 37', being waterproof and low voltage, would also be useful in hot tubs 41, or as patio or other mood lights 37'. The intensity of the lighting could be varied with a variable power supply.

In summary, a method of use of the present invention may comprise the steps of:

a. Providing an LED array, comprising:
  a bus bar;
  a plurality of circuit boards generally vertically oriented relative to said bus bar and generally parallel relative to one another, each of said circuit boards having an upper edge and lower edge and first and second sides, said lower edge engaging said bus bar;
  a plurality of LEDs emanating from said upper edge of said circuit boards;
  a reflective strip situated between each of said circuit boards, said reflective strip having first and second edges folded in an ascending angle of between 30–60 degrees, forming first and second corrugated folds, with a flat medial surface situated therebetween;
wherein said LEDs have a beam of light emanating therefrom, and wherein said beam of light is oriented so as to reflect off of said first or second corrugated folds and said medial surface of said reflective strip, so as to diffuse and disperse said beam of light
b. encasing said LED array in a light transmissive mass;
c. allowing said LED's to provide a beam of light directed to said reflective strip;
d. allowing said reflective strip to disperse and diffuse said light beam, so as to provide diffused and dispersed light; while;
e. allowing said light transmissive polymer to absorb said diffused and dispersed light, so as to cause said light transmissive mass to glow.

The invention embodiments herein described are done so in detail for exemplary purposes only, and may be subject to many different variations in form application and operation methodology. Thus, the detailed disclosure therein should be interpreted in an illustrative, exemplary manner, and not in a limited sense.

We claim:

1. A light system, comprising:
A plurality of light emitting diodes having first and second ends, the first ends of each of said diodes configured to provide light therefrom;
a corrugated reflective surface with holographic characteristics configured to disperse, diffuse, and reflect light emitting from said first ends of said light emitting diodes, said corrugated reflective surface with diffractive characteristics mounted in spaced relation from said diodes, so as to provide a diffused light source:
said plurality of light emitting diodes and said corrugated reflective surface with holographic characteristics encased in a monolithic, light transmissive encapsulating medium.

2. The light system of claim 1, wherein said corrugated reflective surface comprises a reflector with holographic characteristics.

3. The light system of claim 2, wherein said corrugated reflective surface includes first and second, opposing, angled folds forming knuckle edges to diffract and re-direct light reflected therefrom.

4. The light system of claim 3, wherein light emitting diodes are oriented toward knuckle edges for maximum reflection effect and for light duplication effect.

5. The method of providing a tail light for a vehicle, comprising the steps of:
a. providing a light system, comprising:
  a plurality of light emitting diodes having first and second ends, the first ends of each of said diodes configured to provide light therefrom;
  a corrugated reflective surface configured to disperse, diffuse, and reflect light emitting from said first ends of said light emitting diodes, said corrugated reflective surface mounted in spaced relation from said diodes, so as provide a diffused light source;
  said a plurality of light emitting diodes and said corrugated reflective surface encased in a monolithic, light transmissive medium having a light emitting side and a mounting side, forming an encapsulating medium;
b. initiating a signal light viewable from the rear of said vehicle, comprising the steps of:
  I. mounting said mounting side of said encapsulating medium to a vehicle;
  II. selectively energizing said plurality of light emitting diodes, providing generated light;
  III. reflecting said generated light from said corrugated reflective surface with holographic characteristics, so as to disperse, diffuse, and redirect said light throughout said monolithic, encapsulating medium;
  IV. allowing said dispersed, diffused, and redirected light to emit from said light emitting side of said encapsulating medium.

6. A light block, comprising:
an LED array, comprising:
  a bus bar;
  a plurality of circuit boards generally vertically oriented relative to said bus bar and generally parallel relative to one another, each of said circuit boards having an upper edge and lower edge and first and second sides, said lower edge engaging said bus bar;
  a plurality of LEDs emanating from said upper edge of said circuit boards;
  a reflective strip situated between each of said circuit boards, said reflective strip having first and second edges folded in an asending angle of between 30–60 degrees, forming first and second corrugated folds, with a flat medial surface situated therebetween;
said LED array encased in a block of light transmissive polymer.

7. The light block of claim 6, wherein said LEDs have a beam of light emanating therefrom, and wherein said beam of light is oriented so as to reflect off of said first or second corrugated folds and said medial surface of said reflective strip, so as to diffuse and disperse said beam of light.

8. The light block of claim 7, wherein said reflective strip has a surface having formed thereupon a metalized prism.

9. The light block of claim 8, wherein said metalized prism forms a holographic image.

10. The light block of claim 9, wherein said polymer is colored.

11. The method of providing lighting, comprising the steps of:
a. providing a light block, comprising:
  providing an LED array, comprising:
    a bus bar;
    a plurality of circuit boards generally vertically oriented relative to said bus bar and generally parallel relative to one another, each of said circuit boards having an upper edge and lower edge and first and second sides, said lower edge engaging said bus bar;

a plurality of LEDs emanating from said upper edge of said circuit boards;

a reflective strip situated between each of said circuit boards, said reflective strip having first and second edges folded in an ascending angle of between 30–60 degrees, forming first and second corrugated folds, with a flat medial surface situated therebetween;

said LED array encased in a light transmissive polymer;

b. installing said light block at a location;

c. allowing said LED's to provide a beam of light directed to said reflective strip;

d. allowing said reflective strip to disperse and diffuse said light beam, so as to provide diffused and dispersed light, so as to cause said light block to glow.

12. The method of causing a light transmissive mass to glow, comprising the steps of:

a. providing an LED array, comprising:

a bus bar;

a plurality of circuit boards generally vertically oriented relative to said bus bar and generally parallel relative to one another, each of said circuit boards having an upper edge and lower edge and first and second sides, said lower edge engaging said bus bar;

a plurality of LEDs emanating from said upper edge of said circuit boards;

a reflective strip situated between each of said circuit boards, said reflective strip having first and second edges folded in an ascending angle of between 30–60 degrees, forming first and second corrugated folds, with a flat medial surface situated therebetween;

wherein said LEDs have a beam of light emanating therefrom, and wherein said beam of light is oriented so as to reflect off of said first or second corrugated folds and said medial surface of said reflective strip, so as to diffuse and disperse said beam of light b. encasing said LED array in the light transmissive mass;

c. allowing said LED's to provide a beam of light directed to said reflective strip;

d. allowing said reflective strip to disperse and diffuse said light beam, so as to provide diffused and dispersed light, so as to cause said light transmissive mass to glow.

13. The method of claim 12, wherein in step "a" said reflective strip has formed thereon a hologram, and wherein in step "c" said LED's provide a beam of light directed to said hologram on said reflective strip, and wherein in step "d" said hologram diffuses and disperses said light beam, causing same to glow.

* * * * *